Sept. 23, 1941.  A. A. SCARLETT  2,256,816
PLOW
Filed Nov. 29, 1940
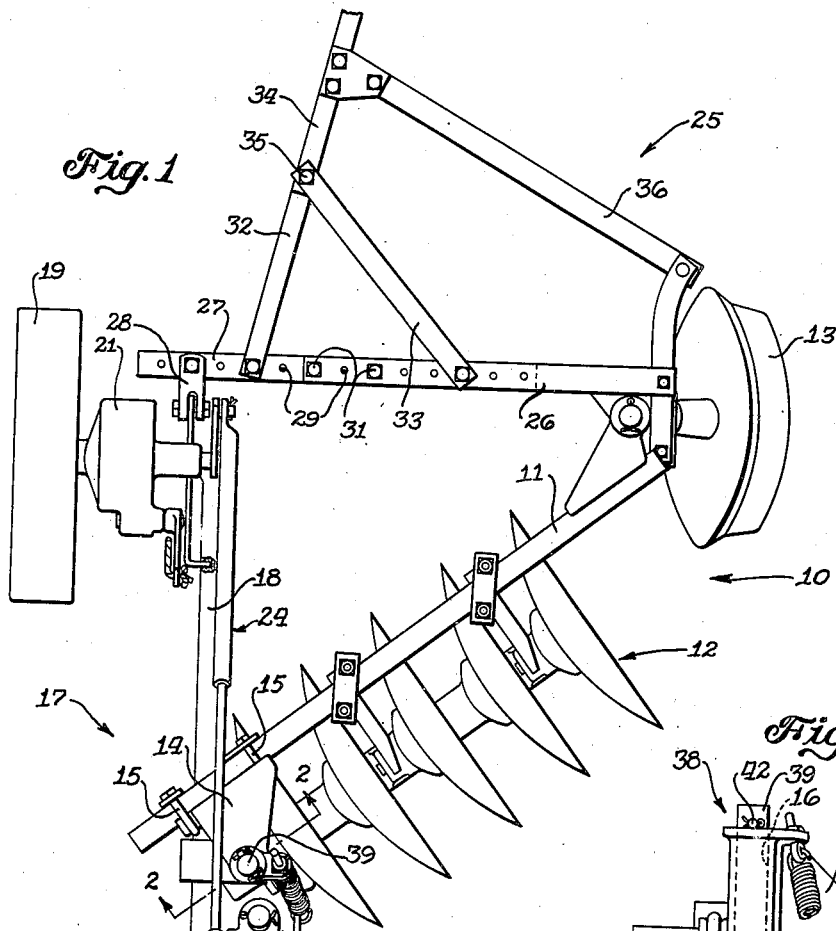
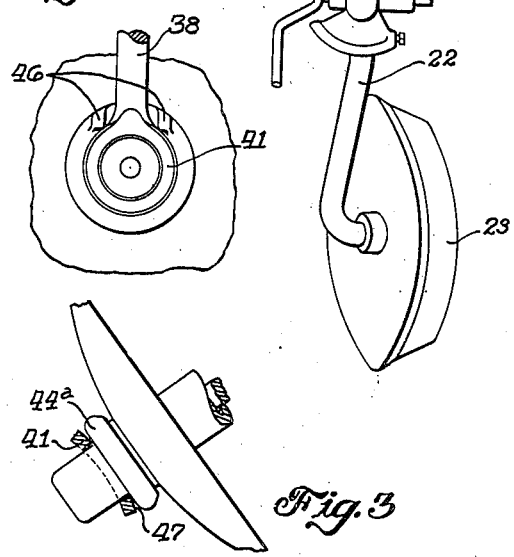
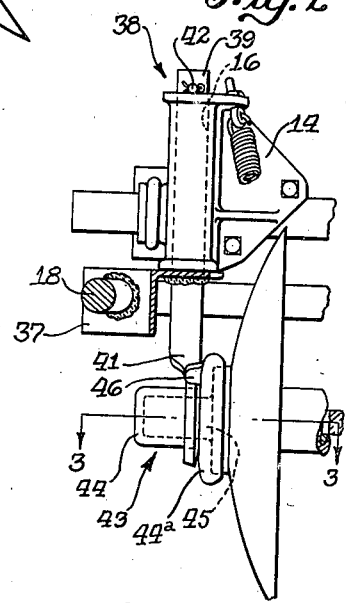
Inventor
Arthur A. Scarlett
By Paul O. Pippel
Att'y.

Patented Sept. 23, 1941

2,256,816

UNITED STATES PATENT OFFICE 2,256,816

PLOW

Arthur A. Scarlett, Hamilton, Ontario, Canada, assignor, by mesne assignments, to International Harvester Company, Chicago, Ill., a corporation of New Jersey Application November 29, 1940, Serial No. 367,751

10 Claims. (Cl. 97—53)

This invention relates to improvements in plows. More specifically the invention relates to an improved disk gang support which is also adapted to serve as a pivot between a plow beam and a wheeled truck.

It is desirable in disk plows to be able to change the cut of the disks, and it is also desirable to provide a support for the disk gang which will take the end thrust thereof.

It is, therefore, an object of the present invention to provide an improved plow construction.

Another object of the invention is to provide a novel means for pivotally connecting a plow beam to a wheeled truck and for supporting the end of the disk gang.

Another object of the invention is to provide a disk plow wherein change in the cut of the disks may be quickly and easily made.

According to the present invention, a plow beam has secured thereon a disk gang unit. The front of the plow beam is supported on a front furrow wheel. The rear of the plow beam is supported on a wheeled truck on which is provided a part that is adapted to pivotally connect the rear of the plow beam and the wheeled truck, and also support the end of the disk gang so as to take the end thrust thereof. A hitch device adjustably connects the front of the frame and the wheeled truck whereby the cut of the disks may be changed. The portion of the part supporting the end of the disk gang is provided with an arcuate face whereby, on adjustment of the plow beam, the end of the disk gang will automatically set itself against the arcuate portion of the part.

A more complete understanding of the invention may be had from the following detailed description taken in conjunction with the accompanying sheet of drawings, in which:

Figure 1 is a plan view of a disk plow embodying the invention;

Figure 2 is a sectional view taken along the line 2—2 of Figure 1, looking in the direction of the arrow;

Figure 3 is a sectional view taken along the line 3—3 of Figure 2, looking in the direction of the arrow; and, Figure 4 is an enlarged view of the end of the disk gang seated in the enlarged eye portion.

In the preferred embodiment of the invention, a disk plow 10 comprises a frame in the form of a plow beam 11 on which is mounted a disk gang unit 12. The front end of the plow beam 11 is adjustably supported on a front furrow wheel 13. At the rear end of the plow beam 11 is provided a member in the form of a pivot bracket 14 which is adapted to be secured to the beam in any one of a plurality of adjustable positions by means of the bolts 15. The pivot bracket 14 is provided with a vertical bore 16. At the rear of the plow beam is provided a wheeled truck 17 which comprises a longitudinally disposed "Z" bar 18. On the front end of the "Z" bar 18 is rotatably mounted a land wheel 19 which is adapted to drive the usual power lift mechanism 21 mounted on the bar 18. At the rear of the bar 18 is journaled an axle 22 on which is rotatably mounted a rear furrow wheel 23. The power lift 21 is connected to the axle 22 by the usual adjustable link connection 24 which, upon operation of the power lift, adjusts the rear axle so as to effect lifting of the plow. Any suitable connection, not shown, may connect the rear axle 22 and the front of the plow beam 11 so as to lift the front of the plow when the power lift is operated.

The front of the plow beam 11 and the front of the wheeled truck 17 is connected by an adjustable hitch device 25 which comprises a transversely disposed bar 26 connected to the front of the plow frame 11, and a second transversely disposed bar 27 which is connected to a clevis 28 provided on the front of the wheeled truck 17 by a bolt 28a. The bar 26 extends over the bar 27 and each bar is provided with a plurality of openings 29. Bolts 31, provided in a pair of the alined openings 29, secure the bars together. If desired, some of the disks on the disk gang unit 12 may be removed to make a smaller plow. When this is done, the width of the hitch is changed by removing the bolts 31. The bars 26 and 27 are then moved together, and the bolts 31 inserted in another pair of alined openings in the bars. A bar 32 is connected to the transverse bar 27, and a diagonally positioned bar 33 is connected to the bars 26 and 27. The bars 32 and 33 converge to a point at which point a draft member 34 is pivotally connected by a bolt 35. The usual connection 36 is provided between the draft member 34 and the front wheel 13 whereby lateral movement of the draft member 34 effects turning of the front furrow wheel 13.

Intermediate the ends of the "Z" bar 18 is secured an angle 37 to which is secured a part 38, which comprises an upstanding spindle portion 39 that extends above the angle 37, and an enlarged eye portion 41 which extends below the angle 37. The pivot bracket 14, provided on the rear of the plow beam 11, is pivotally connected to the upstanding spindle portion 39 by inserting the bore 16 in the bracket 14 on the spindle portion 39. A pin 42 holds the bracket 14 on the spindle 39.

The end of the disk gang unit 12 is provided with a conventional type thrust bearing assembly 43 which comprises a stationary part 44 and a rotatable part 45 that is secured to the disk gang unit 12. The stationary part 44 has a pair of lugs 46 which are adapted to contact each side of the part 38 above the enlarged eye portion 41. The front face of the enlarged eye portion 41 has an arcuate shape 47 which contacts a flange 44a on the stationary part 44.

The part 38 not only pivotally connects the plow beam 11 to the wheeled truck 17, but also serves as a thrust bearing for the end of the disk gang unit 12. The cut of the plow may be changed by adjusting the connection of the clevis 28 to another of the openings provided at the left end of the bar 27. The plow frame pivots about its pivotal connection to the upstanding spindle 39 on the wheeled truck 17. Since the end of the disk gang unit is supported in the enlarged eye portion and is mounted on the plow beam 11, the end thrust of the disk gang is automatically compensated for by the arcuate surface 47 on the eye portion 41.

It will be apparent from the foregoing description that a novel plow construction has been provided. The plow beam is pivotally connected to the wheeled truck by a part which also serves as a thrust bar for the end of the disk gang unit. By this construction the change in cut of the plow may be readily made since the plow beam 11 will move about its pivot connection to the wheeled truck, and the disk gang unit will automatically set itself in the thrust bearing.

While a preferred embodiment of the invention has been illustrated and described, it will be appreciated that numerous modifications and alterations may be made in the elements without departing from the spirit and scope of the invention as defined in the appended claims.

What is claimed is:

1. In combination, a frame, a gang of disks supported from the frame, a wheeled truck, a member adapted to be secured to the frame in any one of a plurality of adjusted positions, and a part on said wheeled truck adapted to be pivotally connected to said member and adapted to support the end of the disk gang.

2. A plow construction comprising a frame, a gang of disks supported from the frame, a wheeled truck, and a part on said wheeled truck adapted to be pivotally connected to said frame and adapted to take the end thrust of the disk gang.

3. A plow construction comprising a frame, a gang of disks supported from the frame, a wheeled truck, means for pivotally connecting the frame to the wheeled truck and for supporting the end of the disk gang, said means comprising a part secured to the wheeled truck and having an upright spindle portion and an eye portion.

4. A plow construction comprising a frame, a gang of disks supported from the frame, a wheeled truck, means for pivotally connecting the frame to the wheeled truck and for supporting the end of the disk gang, said means comprising a part secured to the wheeled truck and having an upright spindle portion and an enlarged eye portion having an arcuate portion contacting the disk gang.

5. In combination, a frame, a gang of disks supported from the frame, a wheeled truck, and a part forming a pivot between the frame and the truck and supporting the disk gang.

6. In combination, a frame, a gang of disks supported from the frame, a wheeled truck, a member adapted to be adjustably secured to the frame in any one of a plurality of positions, and an upstanding part having a spindle portion pivotally connecting the truck and the member and having an enlarged eye portion supporting the disk gang.

7. In combination, a frame, a gang of disks supported from the frame, a wheeled truck, and an upstanding part having a spindle portion pivotally connecting the truck and the frame and having an enlarged eye portion supporting the disk gang.

8. A plow construction comprising a frame, a gang of disks supported from the frame, a front furrow wheel supporting the front of the frame, a wheeled truck, a part secured to the wheeled truck and adapted to have the frame pivotally connected thereto and adapted to support the end of the disk gang, and an adjustable link connecting the frame and the wheeled truck for adjusting the frame about said part.

9. A plow construction comprising a frame, a gang of disks supported from the frame, a front furrow wheel supporting the front of the frame, a member adapted to be secured to the frame in any one of a plurality of adjusted positions, a wheeled truck, a part secured to the wheeled truck and having an upright spindle portion to which the member is pivotally connected and an enlarged eye portion for taking the end thrust of the disk gang, and an adjustable link connecting the frame and the wheeled truck for adjusting the frame relative to the truck.

10. In combination, a frame, a gang of disks supported from the frame, a Z-shaped member, wheels associated with the Z-shaped member, a part secured to the Z-shaped member and extending upwardly serving as a spindle portion, and a pivot bracket adapted to be secured to the frame in a plurality of adjusted positions and journaled on the spindle portion and said part extending downwardly and having an enlarged eye portion having an arcuate surface contacting the disk gang for taking the end thrust of the disk gang.

ARTHUR A. SCARLETT.